K. MATSUO.
GLASS ROLL.
APPLICATION FILED SEPT. 22, 1920.

1,394,684. Patented Oct. 25, 1921.

INVENTOR
Kenji Matsuo
By Wm Wallace White
ATTY.

UNITED STATES PATENT OFFICE.

KENJI MATSUO, OF TOKYO, JAPAN.

GLASS ROLL.

1,394,684.  Specification of Letters Patent.  Patented Oct. 25, 1921.

Application filed September 22, 1920. Serial No. 411,976.

*To all whom it may concern:*

Be it known that I, KENJI MATSUO, subject of Japan, residing at No. 146, Koichi, Mukojima, Honjyo Ku, Tokyo, Japan, have invented certain new and useful Improvements in Glass Rolls, of which the following is a specification.

This invention relates to an improvement in glass rolls hitherto in use and consists in coating the cleaned surface of a steel cylinder with milk glass, with or without, patterns or engraving thereon. The object of this invention is to obtain a roll which is very smooth and hard in its surface and is not corroded by chemicals.

The accompanying drawing shows a roll made according to my invention, in which—

Figure 1:
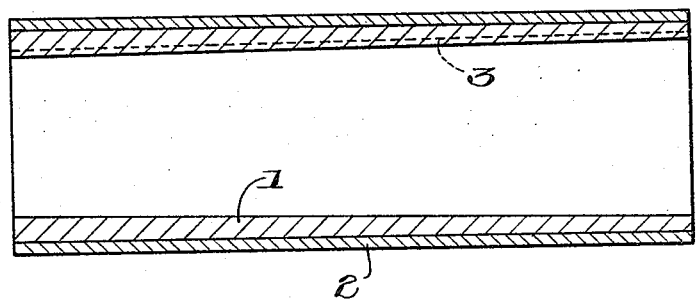

Figure 1 is a front view, and

Figure 2:
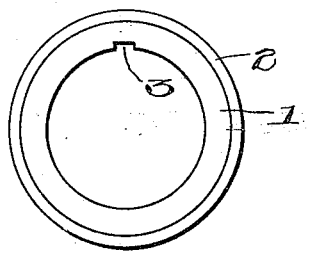

Fig. 2, a longitudinal section.

Glass is a very compact substance and resists the action of chemicals; consequently it is sometimes used as a roll for printing patterns on woven fabrics. But the substance being very brittle, such a roll is easily damaged and is not fit for practical use. Attempts have been made to coat a metal core with melted glass, but the coefficient of expansion of metal and that of glass being greatly different, the glass coating is apt to crack. Now, my invention consists in utilizing for such purpose that kind of glass which has practically the same, or nearly the same, coefficient of expansion as steel, so that the coating of such glass does not crack when cooling.

To describe my invention more fully, coat a hollow steel cylinder (1) whose bore is larger at one end than at the other, and is provided with a desired number of key ways (3), with a layer of milk glass (2), which is rich in metallic constituents, after smoothing the outer surface of the cylinder (1) by means of a lathe or the like, and cleaning it from any rust. Then, grind and polish the surface of the coating of milk glass, and a roll of my invention is formed.

The roll of my invention, being thus very hard and smooth, is well adapted for calendering purpose and as it resists the action of acids, and is incorrosive, it is an excellent substitute for the stone rollers for the purpose of mixing or kneading chemicals. As every one knows a stone roll of a large dimension is very expensive as a large stone of uniform quality is very rare, and as to stone rolls having a small diameter, not only is it very difficult to bore it with a hole for the shaft, but it easily breaks. Now, according to my invention these drawbacks are removed, and rolls of any size, a superior to stone rolls in incorrosiveness and smoothness, can be produced with incomparably smaller expense. Moreover, with stone rolls, it is very difficult to heat it when it is desired to do so, but rolls of my invention can be easily heated by a simple means such as by passing steam through the steel cylinder.

Rolls of my invention may also be used as embossing rolls for printing purposes by etching chemically any desired patterns thereon with hydrofluoric acid, and are far superior to copper rolls hitherto in use for such purposes in hardness and incorrosiveness, besides it is very much cheaper.

I claim:

1. A roll consisting of a steel pipe the outer surface of which is perfectly smoothed and covered with a layer of milk glass which is rich in metallic constituents, substantially as and for the purposes hereinbefore set forth.

2. A roll, consisting of a steel pipe the outer surface of which is perfectly smoothed and covered with a layer of milk glass which is rich in metallic constituents, the said layer of milk glass being etched or engraved with any desired patterns, substantially as and for the purposes hereinbefore set forth.

In testimony whereof, I have affixed my signature.

KENJI MATSUO.